United States Patent

[11] 3,634,770

[72] Inventor Ernst Spreitzhofer
Zum Brachsen, Germany
[21] Appl. No. 5,178
[22] Filed Jan. 23, 1970
[45] Patented Jan. 11, 1972
[73] Assignee Bodenseewerk Perkin-Elmer & Co. GmbH
Uberlingen am Bodensee, Germany
[32] Priority Jan. 25, 1969
[33] Germany
[31] P 19 03 698.7

[54] CIRCUIT ARRANGEMENT RESPONDING TO A SGNAL PEAK
4 Claims, 4 Drawing Figs.

[52] U.S. Cl. .................... 328/115,
307/223, 307/230, 307/235, 330/110
[51] Int. Cl. .................... H03k 5/20
[50] Field of Search .................... 307/247,
223, 230, 235; 328/115, 116; 330/110

[56] References Cited
UNITED STATES PATENTS
3,509,378 4/1970 Petree .................... 307/247

*Primary Examiner*—Donald D. Forrer
*Assistant Examiner*—David M. Carter
*Attorney*—Edward R. Hyde, Jr.

ABSTRACT: A peak detector detects peaks in an analog input signal. The input signal is first amplified and integrated and then applied to a compensating circuit. The compensating circuit includes an analog-to-digtal converter that converts the integrated signal into a corresponding sequence of digital pulses. The digital pulses are counted and stored in a digital counter and then converted by a digital-to-analog converter into a correction signal that is applied to cancel out the input signal. Periodically the compensating circuit is disconnected from the integrator so that a threshold detector, that is coupled to the integrator, can detect an increase or decrease in the amplitude of the input signal as compared to the correction signal. The threshold detector thereby signals the beginning and end of the peaks in the input signal.

PATENTED JAN 1 1 1972 3,634,770

SHEET 1 OF 2

INVENTOR.
ERNST SPREITZHOFER
BY
Frank J. Thompson

INVENTOR.
ERNST SPREITZHOFER
BY

CIRCUIT ARRANGEMENT RESPONDING TO A SGNAL PEAK

The present invention relates to a circuit arrangement responding to a signal peak. A circuit arrangement of the type indicated may, for instance, serve to determine extreme values of a signal pattern, or to initiate a switching action at the beginning or end of peaks. Such problems are, for instance, encountered in gas chromatography. This is a method of separating liquid or gaseous mixtures. The mixture being analyzed is introduced into a carrier gas stream in an injection block. This carrier gas stream transports the sample through a separating column that contains a suitable separating substance. Depending on how strong the affinity of the respective sample component is to the separating substance, as for example how strongly the component goes into solution in a liquid separating substance or is absorbed in a solid separating substance, the individual sample components are more or less strongly retained. Then, the individual components successively appear at the exit of the separating column and are measured with a suitable detector. The detector supplies bell-shaped "peaks," one for each sample component. In order to determine the concentration of the respective sample component, it is necessary to determine the area below such a peak. To this end, signal integrators are known which are switched on when the signal rise exceeds a certain threshold value, and which switch off the integrator in similar manner, when the peak changes over again into the zero line. Also, the printing out the peak height upon passage through the signal maximum may be controlled in rise-dependent manner.

In one prior art circuit, the component signal is amplified and then differentiated electrically. The differentiated signal is interrogated by threshold value sensors as to peak beginning, peak maximum and peak end. The disadvantage of such a circuit resides in the fact that it also responds to stray and noise peaks and thus, may release wrong switching pulses.

In another prior arrangement the amplified input signal is measured over a relatively short time and compared with a similar previous measurement thereof. The disadvantage of this circuit arrangement is the relatively large extent of measuring apparatus for the accurate measurement of the absolute value and the relatively long measuring time for slow wave fronts.

It is an object of the present invention to provide an improved circuit arrangement responding to signal peak. It is a further object of the invention to design a circuit arrangement of the type indicated in such a manner that it does not respond to stray or noise peaks.

It is a still further object of the invention to provide a circuit arrangement of the type indicated which requires a relatively small amount of measuring apparatus.

Finally, it is an object of the invention to provide a circuit arrangement that detects signal peaks with a relatively short measuring time.

In its basic structure the circuit arrangement of the invention is characterized by signal-processing circuit means including an input to which the signal is applied, and an output, a storing compensating device for generating a correction signal across the input, counteracting the signal, control means for controlling the compensating device such that the signal is substantially compensated by the correction signal, at least one trigger stage having a threshold value, at the output of the said signal-processing circuit means and a clock, by which the control means are periodically connectable to the compensating device at intervals of time.

In the circuit arrangement according to the invention a compensation of the input to zero is effected periodically at intervals of time. Then, it is observed how the signal responds between these compensating actions. If the signal remains constant, which corresponds to a zero rise, then the input of the signal-processing circuit means will remain compensated. The trigger stage having a threshold value, at the output of the circuit means, however, does not respond. If, however, the signal rises beyond a certain degree during the measuring time, that means, between the successive compensating actions, then the trigger stage will respond. Therefore, the circuit arrangement according to the invention permits a distinction between the rise of the signal during the measuring time, and no rise at all. There is no differentiation of the signal. During each measuring time interval only the changes in the signal are detected so that it is not necessary to compare the absolute values of the signal amplitudes at successive intervals.

A particularly advantageous arrangement is obtained in that the signal-processing circuit means include an integrating element such as a Miller-integrator. By the use of an integrator the noise is averaged out so that only a genuine signal rise will be detected.

The compensating device may include an electronic counter with a forward and a backward input and a digital-to-analog converter. The control means may include two trigger stages having a threshold value, responding to different polarities, at the output of the signal-processing circuit means through which a pulse sequence may be applied to one input each of the counter. In a further modification of the invention, the input signal is applied through an amplifier that exhibits a nonlinear characteristic in which the amplification decreases with increasing signal amplitude. Such a modification provides an enhanced sensitivity in that, on one hand, weak signal changes in the input signal result in a greater amplification whereas, on the other hand, large signal changes in the input signal result in smaller amplification. Consequently the circuit elements are not saturated by the larger changes.

The present invention will be described in greater detail hereinafter by way of illustrative embodiments with reference to the accompanying drawings, in which:

In FIG. 1 similar parts are provided with the same reference numerals as in FIG. 2.

Figure 1:
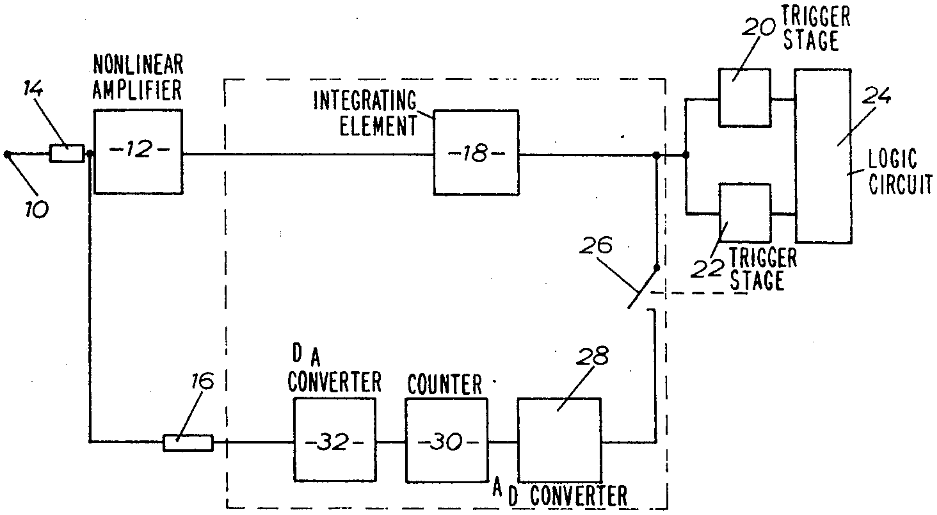
FIG. 1 illustrates a block diagram of a circuit arrangement in accordance with the invention.

A signal, the peaks of which will be monitored, is applied to an input 10. Reference numeral 12 designates a nonlinear amplifier, the total amplification of which decrease with increasing signal amplitude. To the input of this amplifier 12 the signal from the input 10 is applied through a resistor 14. Furthermore, the input of the amplifier 12 has applied thereto through a resistor 16 a correction signal counteracting the signal across the input 10 in a manner to be described hereinafter. The output of the amplifier 12 is applied to an integrating element 18. The output of the integrating element 18 controls two trigger stages 20, 22 having a threshold value responding to different polarities. Therefore, the trigger stage 20 responds when a specific predetermined positive threshold value of the output of the integrating element 18 is exceeded. The trigger stage 22 responds when a specific negative threshold value of the output of the integrating element 18 is exceeded. The two outputs of the trigger stages 20 and 22, which may be in one of two states, control a logic circuit 24.

The output of the integrating element 18 is additionally applied to an analog-to-digital converter 28 through a measuring time transmitter 26 herein illustrated as a switch. The converter generates a pulse sequence which is counted into a counter 30. The counter reading is reconverted through a digital-to-analog converter 32 into an analog signal counteracting, across the input of the amplifier 12, the input signal across the input 10 through the resistor 16.

If the switch 26 is closed and a signal occurs across the output of the integrating element 18, a pulse sequence will be counted into the counter 30 through the analog-to-digital converter. The pulse sequence conditions until the signal generate through the digital-to-analog converter which increases to the counter reading, corrects for the input signal. In this state the pulse sequence ends and the counter 30 stops.

Thereafter, the switch 26 is opened for an exactly defined time (measuring time). The counter 30 remains in the same state and consequently, also the correction signal remains across the input of the amplifier 12 through the resistor 16. If the signal changes to a specific extent during the measuring time, the output signal of the integrating element 18 will exceed either the threshold value of the trigger stage 20 upwardly or the threshold value of the trigger stage 22 downwardly. The respective trigger stage changes into its other state and indicates that the change of the signal exceeds a specific degree towards the one or the other side.

The logic 24 responds to the fact that the trigger stage 20 triggers from the one state which corresponds to an input signal below the threshold value, into the other state so as to signal a peak beginning. When the threshold value of the trigger state 20 is exceeded and then the signal change becomes substantially zero, this signifies a signal maximum. After the signal maximum the trigger stage 22 responds to a decrease in the input signal. Thus, the threshold value of the negative side is exceeded at the rearward peak side. If the trigger stage 22 returns into its initial state, the input signal of the trigger stage 22 decreases from a value greater than the threshold value to a value smaller than the threshold value of the trigger stage 22. This signifies the end of a signal minimum. This analysis is accomplished with conventional logic means.

The integrating element 18 causes the noise to be averaged out substantially. Therefore, no errors due to noise or stray peaks may occur which, of course, may possible exceed the threshold value of the trigger stages 20 or 22.

Figure 2:
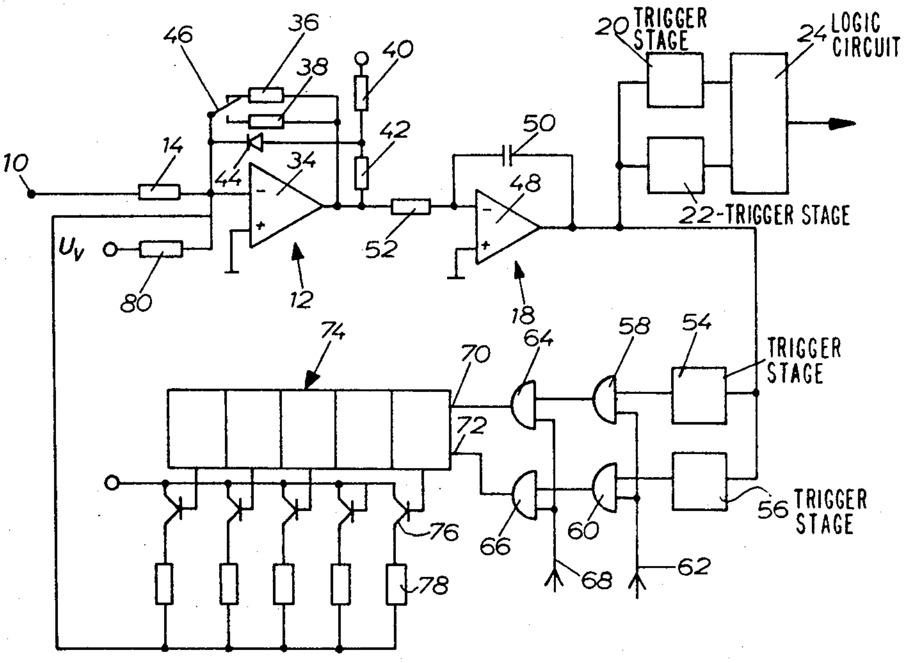
FIG. 2 illustrates schematically a working diagram of a circuit arrangement in accordance with the invention.

Details of the circuit are illustrated in FIG. 2. The nonlinear amplifier 12 includes an integrating calculating amplifier 34 which is wired with resistors 36, 38, 40, and 42, a diode 44, and an auxiliary voltage $U_H$ for obtaining the desired nonlinear characteristic in a manner such that below a changeover point determined by the resistors 40 and 42 and the auxiliary voltage $U_H$, a gain of $V$=100 is obtained and above the changeover point, a gain of $V$=1 is obtained. Through a switch 46 the resistor 38 may be connected in the feedback branch instead of the resistor 36. In this case, a gain of $V$=1.000 will be obtained below the changeover point.

The output of the amplifier 12 is applied to an integrating element 18. This integrating element is designed as a Miller-integrator and includes a calculating amplifier 48, a capacitor 50 in the feedback and a resistor 52. The mode of operation of the Miller-integrator is known per se and need not be described in greater detail. The output of the Miller-integrator is applied to the two trigger stages 20 and 22 having a threshold value. Additionally, it is applied to two trigger stages 54 and 56 having a threshold value. Of these, the one trigger stage 54 will respond upon overshooting of a negative threshold value and will supply a respective L-signal to one of the AND-gates 58 or 60. The second inputs of the AND-gates 58 and 60 are applied to a measuring time transmitter symbolized by the line 62. The AND-gates 58 and 60 with the measuring time transmitter as to their function correspond approximately to the switch 26 of FIG. 1.

The output of the AND-gate 58 or 60 is applied to one input each of two further AND-gates 64 or 66. The two inputs of the AND-gates 64 and 66 are connected with a pulse generator through a line 68. This pulse generator supplies a pulse sequence of predetermined frequency.

The outputs of the AND-gates 64 and 66 are applied to a forward or backward input 70 or 72 of a bidirectional binary counter 74.

The individual counter stages of the counter 74 control one transistor 76 of which acts as a switch for applying a correction signal to the input of the amplifier 12 through one resistor 78 each. The resistors 78, according to the weights of the different counter stages, are dimensioned so that the resulting analog correction signal is proportional to the counter reading of the counter 74.

From an auxiliary voltage source $U_V$ an additional signal is applied to the input of the amplifier 12 through a resistor 80. Thereby, the amplifier is biased whereby also in the absence of an input signal across the input 10 a finite counter reading is present at the counter 74 counterbalancing this additional signal. In this manner, the counter 74, by increasing its counter reading or decreasing the same below the counter reading present in a state of rest, may correct both positive and also negative deviations of the input voltage.

The arrangement as hereinbefore described operators as follows:

Prior to the occurrence of a peak the input signal across the input 10 is zero. Deviations from the zero line in either the positive or negative directions will be corrected by a correction signal derived from the counter 74 along with the bias voltage applied through the resistor 80. In this state, all trigger stages 20, 22 and 54, 56 are in their stages of rest, so that the output of these trigger stages is O. The measuring time transmitter supplies an L-signal to the line 62 at periodical intervals. The AND-gates 58 and 60, however, remain blocked as long as the trigger stages 54 and 56 have not responded. Accordingly, also the AND-gates 64 and 66 remain blocked, so that no pulses can be counted into the counter 74. With the occurrence of a peak, the input signal from the input 10 is integrated by the integrating element 18, over the measuring time, that is the interval between two successive L-signals on the line 62. If, during this measuring time, the threshold value of the trigger stage 20 is exceeded, the trigger stage 20 will trigger. The logic circuit 24 signals "peak beginning." Hereby, an integrator is, for instance, switched on. Also the trigger stage 54 is triggered from its state of rest and applies L-signal to the AND-gate 58. Now, if on line 62 the second L-signal occurs for a predetermined time, L-signal will be obtained across the output of the AND-gate 58. Thereby the gate 64 is opened, and pulses are applied by the pulse generator to the forward input 70 of the binary counter 74 through the line 68. This will be done, until the correction signals applied to the input of the amplifier 12 by the binary counter through the switching transistors 76 and the resistors 78 have made the output of the integrating element 18 substantially zero, thus the trigger stage 54 has returned into its initial state. When the L-signal on the line 62 has ceased, the next measuring time will begin. First, the input is compensated, that means that the correction signal counterbalances the input signal, possibly under consideration of the additional voltage $U_V$. Starting from this state of compensation, the change in the signal is monitored again during the next measuring time. This signal change will be integrated and again cause the trigger stage 54 to respond.

At the end of the measuring time a new compensation is effected through an L-signal on the line 62, etc. This process is repeated, until the signal maximum is approximated. Then, there will be no responding of the trigger stages 20 and 54. The logic circuit 24 "concludes" as to the occurrence of the signal maximum and effects, for instance, a printing out of the instantaneous value of the input signal. For decreasing signal, thus negative signal rise, the process is accordingly. Then, the amplitude of the input signal, during a measuring time interval, is smaller than the amplitude which had been compensated through the counter 74 and the correction signal controlled thereby. A negative input voltage occurs across the integrating element 18 and accordingly, a negative output voltage. Then, the trigger stage 22 or the trigger stage 56 is caused to respond. During the next compensation with L-signal on the line 62 pulses are applied to the backward input 72 of the counter 74 through the gate 66. If the signal rise during a measuring time interval overshoots the threshold value of the trigger stage 22—taken absoute—this will signify the transition from a sloping side of the signal to a horizontal signal pattern. Then, the logic circuit 24 signals "peak end."

The nonlinear amplifier 12 ensures that on the one hand in the range of small output voltages a high sensitivity, is given, that on the other hand no overriding, for instance, of the integrating element 18 can occur with steep rise of the signal and accordingly great input voltages.

In the arrangement according to the invention all parts are designed strictly electronically. Therefore, the arrangement can operate very quickly so that the measuring time interval may be selected very short. Consequently, the circuit arrangement is also able to satisfactorily monitor relatively rapidly proceeding actions.

Figure 3:
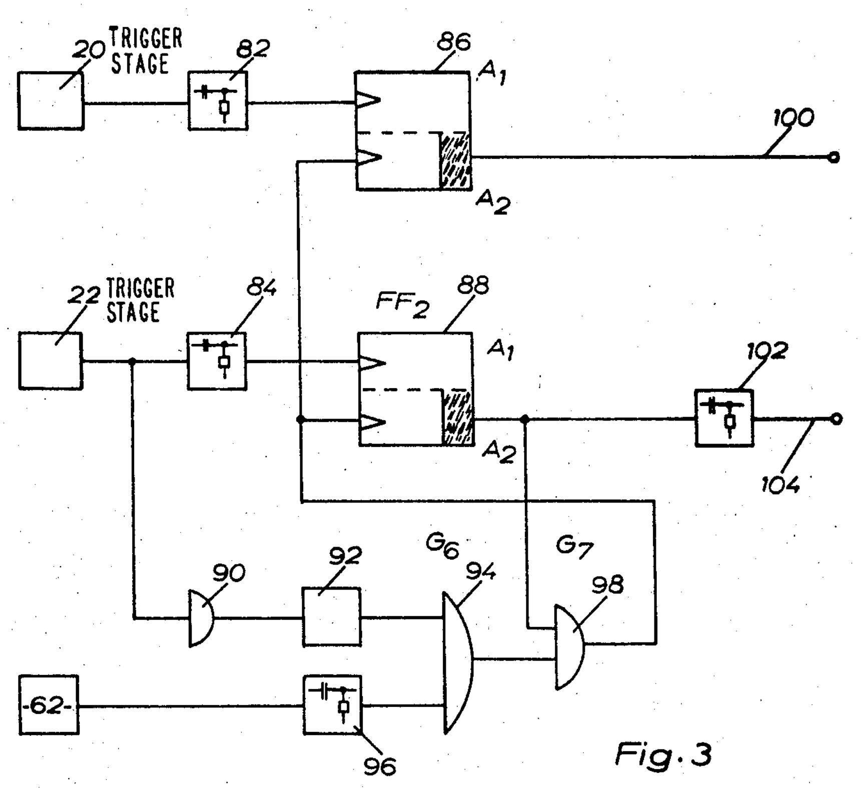
FIG. 3 illustrates an embodiment of the analyzer-logic circuit of FIGS. 1 and 2.

An embodiment of the logic circuit 24 is illustrated in FIG. 3. The signals from the trigger stages 20 and 22 are differentiated by differentiating elements 82 or 84. The pulses obtained thereby are applied to one bistable flip-flop each 86 or 88. The signal from the trigger stage 22 is inverted through an inverting element 90 and finally, the pulse end is delayed in a circuit 92 by a delay time $T_v$. The signal so obtained is applied to an AND-gate 94. The second input of the AND-gate 94 is controlled by the clock 62 through a differentiating element 96. The output of the AND-gate 94 is applied to one input of an AND-gate 98. The other input of the AND-gate 98 is controlled by the second output $A_2$ of the bistable flip-flop 88. The output of the AND-gate 98 is applied to the second inputs of the two bistable flip-flops 86 and 88.

The output $A_2$ of the bistable flip-flop 86 is applied to a first signal output 100. The output $A_2$ of the bistable flip-flop 88 is applied to a second signal output 104 through a differentiating element 102.

Figure 4:
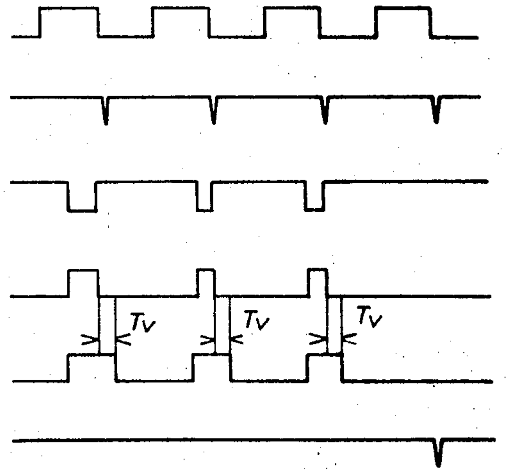
FIG. 4 illustrates the various signal waveforms which occur in the logic circuit of FIG. 3.

The arrangement as hereinbefore described operates as follows:

As already described above, the trigger stage 20 supplies pulses at peak rise and the trigger stage 22 supplies pulses at peak decrease. These pulses can only occur during the measuring times determined by the measuring time transmitter 62 and illustrated in FIG. 4 in the first line. The first negative pulse of the trigger stage 20 is used for recognition of the peak beginning. The negative side is transformed into a negative needle pulse in the differentiating element 82. This needle pulse sets the bistable flip-flop 86. Across the signal output 100 the state L changes over into the state O.

For determination of the peak maximum the first negative pulse of the trigger stage 22 is differentiated in the differentiating element 84 and sets the bistable flip-flop 88. The differentiating element 102 differentiates the transition from L to O across the output $A_2$ of the bistable flip-flop 88. Upon passage through a maximum thus a negative needle pulse may be derived across the signal output 104.

The peak end can be recognized by the fact that the pulse sequence from the trigger stage 22 ceases. At the end of each individual measuring time a negative needle pulse is generated by means of the differentiating element 96. The pulses from the trigger stage 22 are inverted in the inverting stage 90 and the pulse end is shifted in the stage 92 by a delay time $T_v$. During peak decrease no needle pulses are then obtained across the output of the AND-gate 94. Only when the peak end has been reached and the trigger 23 does not supply any pulses anymore, the AND-gate 94 will be open for the then occurring differentiated signals from the clock 62 at the end of the measuring time. These needle pulses are applied to the second inputs of the bistable flip-flops 86 and 88 through the AND-gate 98 and return the same into the initial position. This, however, is only done, if the AND-gate 98 is opened from the output $A_2$ of the bistable flip-flop, 88, thus, if a peak decrease has preceded the termination of the pulse sequence from the trigger stage 24. If this is the case, the first pulse passing to the bistable flip-flop 86 and 88 through the AND-gate 98 returns the same into their initial positions. Across the output 100 the state O changes over into the state L. The peak has ended. The zero compensation and the counter for the peak area may be controlled by the output 100. The pulse occurring across the output 104 may be used to carry over the retention time or to print out the peak maximum.

I claim:

1. A circuit arrangement that detects peaks in an analog input signal comprising in combination a signal-processing circuit having an input to which said input signal is applied, and an output, a compensating circuit coupled to said output for generating and storing a correction signal that corresponds to said input signal, means for applying said correction signal to said input of said signal processing circuit to counteract said input signal to produce substantially no output signal from said output of said signal processing circuit, means for periodically disconnecting said compensating circuit from the output of said signal processing circuit to permit said output signal to increase above and decrease below said correction signal, a threshold circuit coupled to said output of said signal processing circuit to detect increases and decreases in said input signal that exceeds said threshold so a to detect peaks in said input signal.

2. A circuit arrangement as claimed in claim 1, wherein:

said signal processing circuit includes an integrator circuit.

3. A circuit arrangement as claimed in claim 1 wherein:

said compensating circuit includes an analog-to-digital converter coupled to the output of said signal processing circuit for generating a sequence of digital pulses corresponding to said input signal, a digital counter coupled to said converter, for counting said pulses, and a digital-to-analog converter coupled to said counter for converting said count into an analog correction signal.

4. A circuit arrangement as claimed in claim 3, wherein said threshold circuit includes first and second trigger circuits coupled to said output of said signal-processing circuit for triggering on positive and negative excursions respectively of said input signal that exceed predetermined thresholds, and a logic circuit coupled to said trigger circuits to signal the activation of said trigger circuits.

* * * * *